(12) United States Patent
Michels

(10) Patent No.: US 7,882,807 B2
(45) Date of Patent: Feb. 8, 2011

(54) CALF HUTCH COVER AND HOOK

(76) Inventor: James Marlin Michels, 22489 County Hwy. 4, Pelican Rapids, MN (US) 56572

( * ) Notice: Subject to any disclaimer, the term of this patent is extended or adjusted under 35 U.S.C. 154(b) by 624 days.

(21) Appl. No.: 11/725,619

(22) Filed: Mar. 20, 2007

(65) Prior Publication Data

US 2008/0230011 A1      Sep. 25, 2008

(51) Int. Cl.
*A01K 1/00*      (2006.01)
*A01K 1/03*      (2006.01)
(52) U.S. Cl. ..................... 119/500; 119/448
(58) Field of Classification Search ............ 119/500, 119/416, 436, 473, 498, 513, 514, 516, 522, 119/499, 501, 448, 493, 165; *F24F 7/00*
See application file for complete search history.

(56) References Cited

U.S. PATENT DOCUMENTS

| | | | | |
|---|---|---|---|---|
| 4,366,773 A | * | 1/1983 | Johanneck | 119/500 |
| 4,443,387 A | * | 4/1984 | Gordon | 261/30 |
| 4,693,852 A | * | 9/1987 | Gordon | 261/30 |
| 5,158,502 A | * | 10/1992 | Frost | 454/364 |
| 6,408,796 B1 | * | 6/2002 | Hampel | 119/498 |
| 6,810,832 B2 | * | 11/2004 | Ford | 119/437 |
| 7,287,486 B2 | * | 10/2007 | Hunter | 119/57.8 |
| 2005/0120967 A1 | * | 6/2005 | Ruff | 119/52.2 |
| 2008/0011239 A1 | * | 1/2008 | Byers | 119/500 |

* cited by examiner

*Primary Examiner*—Son T Nguyen
*Assistant Examiner*—Shadi Baniani
(74) *Attorney, Agent, or Firm*—Kinney & Lange, P.A.

(57) ABSTRACT

A cover and lifter for use with an outdoor device having at least one ventilation port, such as a calf hutch and the like, including a shaft having a hook on its outer end and a fastener on its inner end that holds a lift plate against the under side of the top of the outdoor device. Preferably the materials from which the cover and lifter are made are weather resistant, such as stainless steel.

9 Claims, 1 Drawing Sheet

CALF HUTCH COVER AND HOOK

FIELD OF THE INVENTION

The present invention relates to an improved calf hutch used for sheltering newly born calves. More particularly, the invention relates to a device that allows the calves to be sheltered more completely from adverse weather conditions and also allows the calf hutch to be readily moved from one location to another.

BACKGROUND OF THE INVENTION

Dairy farming has evolved over the years into a highly efficient and effecting industry. A now common management operation is to place calves in individual calf hutches where they are fed, weaned, immunized and generally cared for until they are deemed ready for transfer to a herd or to a barn.

The purpose of individual calf hutches is to provide sufficient isolation to reduce transfer of disease and other harmful organisms that are carried by more mature animals, as well as to insure that the individual calves get proper nutrition to maximize growth.

Once the calf is weaned, typically when the calf reaches the age of eight or nine weeks, depending on the individual calf and the practices of the farm, it is still common to segregate the calf for a period of time.

Baby calf raising can, unfortunately, be the weakest link in a calf operation, due to stress from the environment, exposure to disease, weather effects such as excessive heat or cold, and contamination from bedding. Ventilation is essential but so is prevention of exposure to rain, wind, snow, and excessive sun.

Calf hutches used for feeding, watering, sheltering and holding calves come in a variety of shapes and configurations, with elaborate doors, vents, and other embodiments. What has been found to be most effective, however, are calf hutches that are dome shaped. The most effective shapes are rounded roof or ceiling domes on a circular base. Other shapes such as ones with multiple sides are also effective, but only when a vent scheme is used that provides for changes in direction of the vent. Cylindrical vent covers that rotate about the vertical axis of the calf hutch allow the operator to open or close various vent holes depending on the environmental conditions and the health of the calf.

If the vent system is not protected, and many are not protected, water in the form of rain or melting snow will cause the bedding to be wet. Wet bedding is unsanitary and can cause harm to the calf's heath. Changing bedding every time it rains is also expensive, and a difficult balance between risk to the calf and cost to maintain the calf offers no good choice.

Many calf farms have a large number of calves, and thus it is necessary to have a large number of calf hutches. This often causes difficulty if the individual hutches, which can weigh between 100 and 200 pounds or more, are awkward to move, and may cause damage to the hutch or injury to the operator.

It would be of advantage in the art if a device could be provided that would allow for protection of the calf and the bedding while permitting adequate ventilation Yet another advantage would be if the device could be easily moved from one location to another.

Other advantages will appear hereinafter.

SUMMARY OF THE INVENTION

It has now been discovered that the above and other advantages of the present invention may be obtained in the following manner. Specifically, the present invention provides a calf hutch cover that extends out from the top of the hutch. The cover is preferably round and has a diameter that is large enough to block rain, snow and direct sunlight under most conditions. Of course if there is a blizzard, for example, the vents will be closed or, in some cases, moved to be out of the direct path of generally horizontally blown rain or snow.

The cover is mounted on the calf hutch using a shaft that passes through a hole in the top of the hutch. A hook is formed on the outer end of the shaft. The shaft is preferably threaded. A fastening means such as a hex nut spaces the hook from the cover.

The inner end of the shaft that extends through the hole, through the cover and into the hutch, has a second fastening means, such as a hex nut for example, that holds a lift plate against the under side of the hutch top, and is tightened to secure the lift plate in place.

In instances where the calf hutch itself is not cylindrical or tapered like a lower segment of a cone, the vent component is still cylindrical or segmented from a cone so that the vent can rotate. However, if the calf hutch does not have a movable or slidable vent cover, the vent may still be covered with the device of this invention. All that is required is that there be a surface at the top of the calf hutch that will accommodate the cover, shaft, hook and lift plate of this invention.

BRIEF DESCRIPTION OF THE DRAWINGS

For a more complete understanding of the invention, reference is hereby made to the drawings, wherein like numbers refer to like elements, and in which.

DETAILED DESCRIPTION OF THE PREFERRED EMBODIMENT

Figure 1:
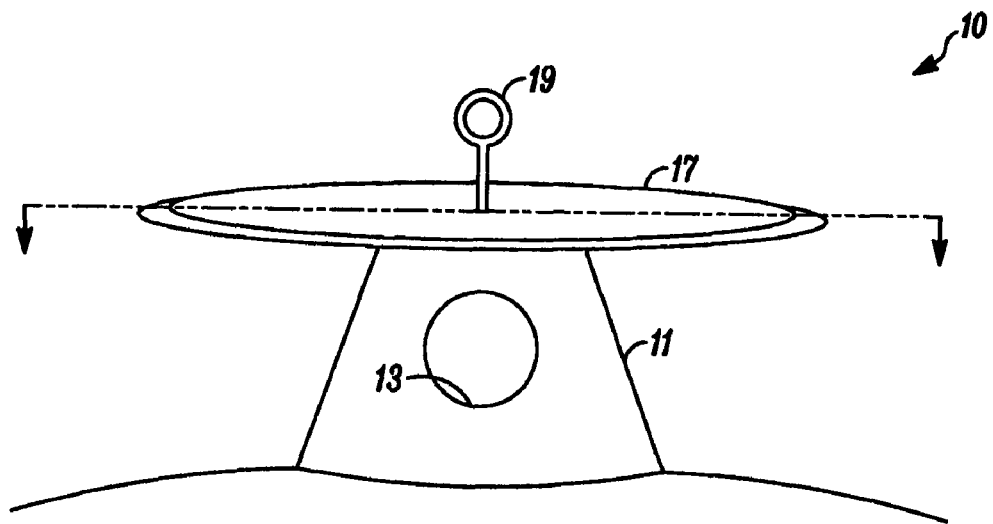
FIG. 1 is a side elevational view of the preferred embodiment of this invention.
Figure 2:
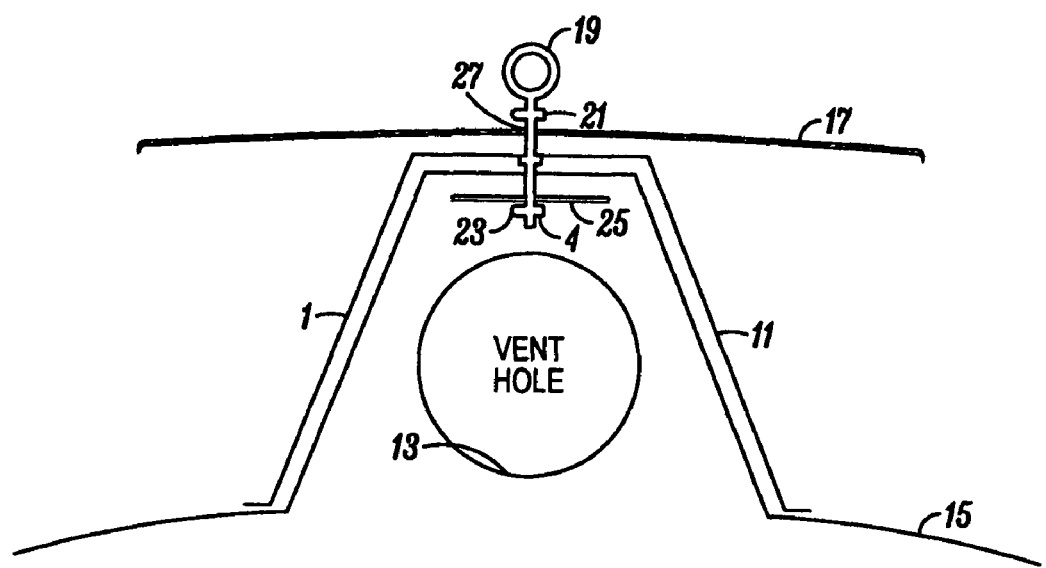
FIG. 2 is a sectional view taken along the line 2-2 of FIG. 1.

As shown in FIG. 1, the device of this invention 10 generally is mounted on the top of a calf hutch vent cover 11, which in this embodiment includes one or more vent holes 13. FIG. 2 illustrates the top of the calf hutch 15 and shows how vent cover 11 can rotate about the axis of the cover to expose or cover as much or as little of vent hole 13 as needed or wanted. Note that the top of calf hutch 15 extends up into the inside of vent cover 11.

On top of the vent cover 11 is a vent cover 17. The preferred vent cover 17 is slightly curved, as shown in FIG. 2, and has its ends turned down to increase the effectiveness of the cover 17. Preferably the cover 17 is twice the diameter of the vent cover 11 and the top of the hutch 15.

Passing through cover 17 is a shaft 27 with a hook 19 on its external end. Preferably shaft 27 is threaded from the hook 19 to it's inner end. A ⅜ inch shaft has been found to be effective. The hook 19 should be large enough to allow a fork lift prong or other device to engage it for carrying, as described below.

The shaft 27 is secured to the top of calf hutch vent cover 11 by a fastening means such as a first hex nut 21 which has been threaded on to shaft 27 and abuts the top of cover 17. On the other side of cover 17 is a lifting plate 25, which is, in FIG. 2, a 4 inch washer of sufficient thickness to bear the weight of the entire assembly. 3/16 inch thick washer with a ⅜ inch hole to accommodate shaft 27 has been found to be effective. A second fastening means, such as hex nut 23 locks lifting plate 25 against the inside of vent cover 11 and provides support so that when the entire unit is lifted, such as by engaging hook 19 with a fork lift prong or a skid loader, the device can easily be lifted, moved, or stored.

Tests have shown that vent cover 11 is effective in keeping the inside litter or bedding far dryer in the rain season, and also darkens down sunlight on hot days. In a preferred embodiment, the hex nuts 21 and 23 are not tightened too tight, but allow for pivot movement of the entire shaft 27. Preferably, all the parts except for the vent cover 11 are made from stainless steel, with the vent cover being formed from weather resistant plastic.

While particular embodiments of the present invention have been illustrated and described, it is not intended to limit the invention, except as defined by the following claims.

The invention claimed is:

1. A cover and lifter device for use with calf hutch having at least one ventilation port and an upper surface, comprising:
   a calf hutch having at least one ventilation port and an upper surface;
   a shaft having a hook on its outer end and having an inner end, said shaft being adapted to be inserted through said upper surface of said calf hutch;
   a cover having a generally horizontal surface of sufficient size to cover said at least one ventilation port against generally vertically directed weather elements;
   a first fastener on the outer end of said shaft for positioning said hook and said cover on said shaft with respect to said upper surface of said calf hutch;
   a lift plate positioned on said inner end of said shaft to engage the inside of said upper surface of said calf hutch; and
   a second fastener on said inner end of said shaft for holding said lift plate against the underside of the top of the calf hutch to permit lifting of the calf hutch when the hook is raised;
   whereby said calf hutch is moveable by raising said hook and said cover is positioned to protect said ventilation port.

2. The device of claim 1, wherein said lift plate is a circular plate of sufficient diameter to spread the weight of said calf hutch over a sufficient portion of said underside of said top of said calf hutch.

3. The device of claim 1, wherein said calf hutch includes at least one ventilation ports extending in a radial direction from the vertical axis of said calf hutch.

4. The device of claim 1, wherein said calf hutch further includes a vent cover positioned to be rotated about said vertical axis to cover selected ventilation ports of said plurality of ventilation ports.

5. The device of claim 1, wherein said shaft is threaded.

6. The device of claim 5, wherein said first fastener is a nut threaded on to said shaft prior to insertion of said shaft through said cover.

7. The device of claim 6, wherein said second fastener is a nut threaded on to said shaft after insertion of said shaft through said cover and into said outdoor device.

8. The device of claim 1, wherein said lift plate is circular.

9. The device of claim 8, wherein said lift plate has a diameter of about half the diameter of said cover.

\* \* \* \* \*